(12) United States Patent
Hinoue et al.

(10) Patent No.: US 7,517,597 B2
(45) Date of Patent: Apr. 14, 2009

(54) MAGNETIC RECORDING MEDIUM

(75) Inventors: Tatsuya Hinoue, Kanagawa (JP); Hiroyuki Suzuki, Kanagawa (JP); Tetsuya Kanbe, Kanagawa (JP); Koji Sakamoto, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 469 days.

(21) Appl. No.: 11/012,387

(22) Filed: Dec. 14, 2004

(65) Prior Publication Data

US 2005/0142389 A1    Jun. 30, 2005

(30) Foreign Application Priority Data

Dec. 24, 2003    (JP)    ............................. 2003-427343

(51) Int. Cl.
*G11B 5/66*    (2006.01)

(52) U.S. Cl. ...................................... 428/831

(58) Field of Classification Search ................. 428/831
See application file for complete search history.

(56) References Cited

U.S. PATENT DOCUMENTS

| | | | |
|---|---|---|---|
| 5,693,426 A | | 12/1997 | Lee et al. |
| 5,968,679 A | * | 10/1999 | Kobayashi et al. ....... 428/831.2 |
| 6,248,416 B1 | * | 6/2001 | Lambeth et al. .......... 428/832.2 |
| 6,627,253 B2 | * | 9/2003 | Suzuki et al. ............... 427/129 |
| 6,787,251 B1 | * | 9/2004 | Wu et al. .................. 428/832.2 |
| 7,056,604 B2 | * | 6/2006 | Kanbe et al. ................. 428/832 |
| 7,128,988 B2 | * | 10/2006 | Lambeth .................. 428/831.2 |

(Continued)

FOREIGN PATENT DOCUMENTS

JP    04/188427 A    7/1992

(Continued)

OTHER PUBLICATIONS

Abarra et al., "Longitudinal magnetic recording media with thermal stabilization layers," *Appl. Phys. Lett.*, vol. 77, pp. 2581-2583, Oct. (2000).

(Continued)

*Primary Examiner*—Holly Rickman
*Assistant Examiner*—Gary D Harris
(74) *Attorney, Agent, or Firm*—Townsend and Townsend and Crew LLP; Darren Gold

(57) ABSTRACT

Embodiments of the present invention provide a magnetic recording medium for use in high-reliable magnetic recording apparatus capable of reading/writing information with high density. In one embodiment, a magnetic recording apparatus includes a magnetic recording medium, a driver for driving the medium in a recording direction, a compound type magnetic head having an electromagnetic induction type magnetic head for recording and a spin-valve type magnetic head for reading in combination, a mechanism to move the head relative to the medium, and a read/write signal processing module for the head. The magnetic recording medium has a magnetic layer formed by way of a first underlayer, a second underlayer and a third underlayer on a substrate. The first underlayer comprises an alloy of an amorphous structure, the second underlayer comprises a W element or a W-containing alloy layer, the third underlayer comprises one or more Cr-based alloy layers of a body-centered cubic structure, and the magnetic layer comprises one or more Co-based alloy layers of a hexagonal close-packed structure.

16 Claims, 6 Drawing Sheets

U.S. PATENT DOCUMENTS

| | | | |
|---|---|---|---|
| 7,163,756 B2 * | 1/2007 | Yamamoto et al. | 428/831 |
| 7,211,340 B2 * | 5/2007 | Nolan | 428/831.2 |
| 2002/0197515 A1 * | 12/2002 | Matsuda et al. | 428/694 TM |
| 2004/0058196 A1 * | 3/2004 | Lambeth | 428/694 BH |
| 2004/0258925 A1 | 12/2004 | Lee et al. | |

FOREIGN PATENT DOCUMENTS

| | | |
|---|---|---|
| JP | 08-212531 A | 8/1996 |
| JP | 2001-209927 A | 8/2001 |

OTHER PUBLICATIONS

Fullerton et al., *Appl. Phys. Lett.*, vol. 77, pp. 3806-3808, Dec. 2000.

Kang et al., "Two-photon transitions between bound-to-continuum states in AlGaAs/GaAs Multiple Quantum Well," *Appl. Phys. Lett.*, vol. 73, 3638-3640, 1998.

* cited by examiner

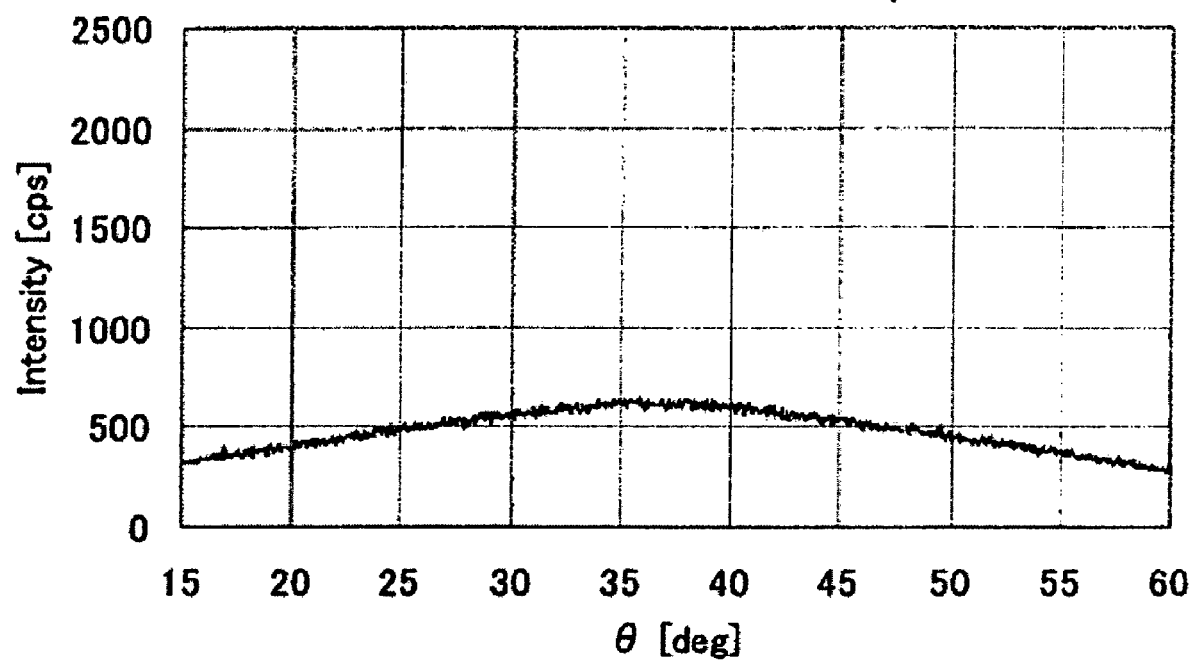
Fig.8 Specimen No.213
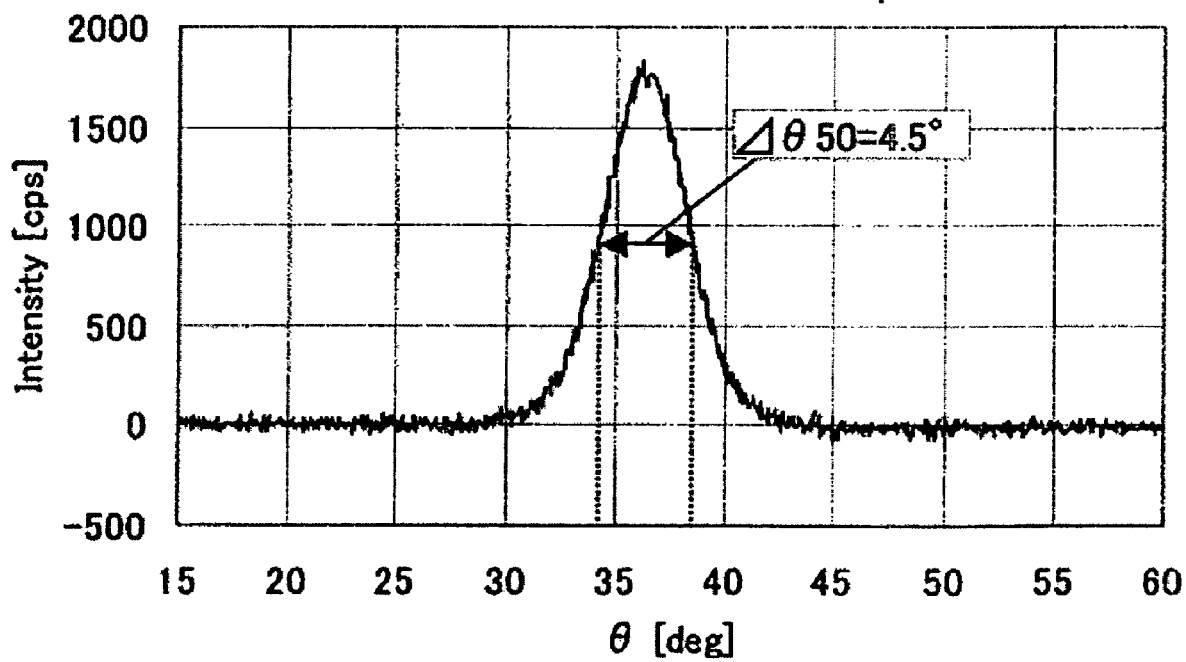
Fig.9 Specimen No.213
$\Delta\theta 50 = 4.5°$

MAGNETIC RECORDING MEDIUM

CROSS-REFERENCES TO RELATED APPLICATIONS

This application claims priority from Japanese Patent Application No. JP 2003-427343, filed Dec. 24, 2003, the entire disclosure of which is incorporated herein by reference.

BACKGROUND OF THE INVENTION

The present invention relates to magnetic recording media and magnetic recording apparatuses capable of recording information of large capacity and, more particularly, it relates to a magnetic recording medium suitable to high density magnetic recording and a magnetic recording apparatus of small-sized and large recording capacity using the same.

Along with rapid development in the IT industry, a demand for larger recording capacity has been increased more and more for magnetic disk apparatus. To cope with the demand, it has been required to develop magnetic heads with a high degree of sensitivity and recording media with a high S/N ratio. In order to improve the S/N ratio of recording media, it is necessary to improve the read output when recorded at high density. Generally, a recording medium comprises a first underlayer referred to as a seed layer formed on a substrate, a second underlayer of a body-centered structure comprising a Cr alloy, a magnetic layer, and a carbon protection layer. For the magnetic layer, a Co-based alloy of a hexagonal close-packed structure mainly comprising, for example, Co—Cr—Pt—B or Co—Cr—Pt—Ta, is used. In order to improve the read output, it is effective to orient the magnetic layer such that the (11.0) plane or (10.0) plane is substantially parallel with the substrate surface to direct the c-axis as an easy axis of magnetization in the in-plane direction. It has been known that the crystal orientation of the magnetic layer can be controlled by the seed layer. In addition, it has been reported that orientation in the former is obtained by using Ta (JP-A No. 4-188427, JP-A No. 8-212531, U.S. Pat. No. 3,298,893) or MgO (Appl. Phys. Lett., Vol. 67, pp. 3638-3640, December (1993)) and orientation in the latter is obtained by using an NiAl alloy (U.S. Pat. No. 5,693,426) of the B2 structure or the like. Further, it has been known that the read output can be improved also by applying mechanical texturing to the substrate surface to introduce magnetic anisotropy in the circumferential direction. Heretofore, texturing has been applied mainly to an Al—Mg alloy substrate coated with an NiP plated layer. However, JP-A No. 2001-209927 discloses that the magnetic anisotropy can be introduced also by subjecting the surface of a glass substrate to texturing.

On the other hand, a reduction in medium noise is also an important subject for improving the medium S/N ratio, along with an improvement in the read output. In order to reduce medium noise, it is effective to form the magnetic layer from finer particles and decrease Br×t as a product of residual magnetic flux density (Br) and a film thickness (t) of the magnetic layer. However, since excess miniaturization of particles or excess reduction of Br×t deteriorates the thermal stability, a limit is imposed on the noise reduction. In recent years, anti-ferromagnetically coupled medium has been proposed (Appl. Phys. Lett., Vol. 77, pp. 2581-2583, October (2000); Appl. Phys. Lett., Vol. 77, pp. 3806-3808, December (2000)) as a technique for compabilitizing the thermal stability and noise reduction. In this technique, the magnetic layer is formed as a two-layered structure anti-ferromagnetically coupled by way of an Ru intermediate layer, in which Br×t can be set lower while keeping the thickness of the magnetic layer great as it is, compared with a medium comprising a single magnetic layer. Thus, the medium noise can be reduced while keeping the thermal stability.

However, even the combination of the techniques described above is still insufficient to attain an areal recording density of 70 Mbits or more per 1 mm$^2$ and it is further necessary to improve the read output and reduce the medium noise.

BRIEF SUMMARY OF THE INVENTION

A feature of the present invention is to provide a magnetic recording medium having a high medium S/N ratio and also sufficient stability to thermal fluctuation, as well as to provide a magnetic recording medium for attaining a highly reliable magnetic recording apparatus having an areal recording density of 70 Mbits or more per 1 mm$^2$ by combining a head with high-sensitivity therewith to optimize reading and writing conditions.

The foregoing feature can be obtained by the media of the following constitution.

1. A magnetic recording medium in which a magnetic layer is formed by way of a first underlayer, a second underlayer, and a third underlayer on a substrate, wherein the first underlayer comprises an alloy of an amorphous structure, the second underlayer comprises a W element or a W-containing alloy, the third underlayer comprises a Cr-based alloy layer of a body-centered cubic structure at least containing Ti or B, and the magnetic layer comprises one or more Co-based alloy layers of a hexagonal close-packed structure.

2. A magnetic recording medium in which a magnetic layer is formed by way of a first underlayer, a second underlayer, and a third underlayer on a substrate, wherein the first underlayer comprises an alloy of an amorphous structure, the second underlayer comprises a single W element or a W-containing alloy, the third underlayer comprises a two or more Cr-based alloy layers of a body-centered cubic structure, and the magnetic layer comprises one or more Co-based alloy layers of a hexagonal close-packed structure.

3. A magnetic recording medium in which a magnetic layer is formed by way of a first underlayer, a second underlayer, and a third underlayer on a substrate, wherein the first underlayer comprises an amorphous alloy comprising at least two kinds of elements selected from Ni, Co, Ti, Ta, Al, and Zr, the second underlayer comprises a W element or a W-containing alloy, the third underlayer comprises a Cr-based alloy layer of a body-centered cubic structure, and the magnetic layer comprises one or more Co-based alloy layers of a hexagonal close-packed structure.

4. A magnetic recording medium in which a magnetic layer is formed by way of a first underlayer, a second underlayer, and a third underlayer on a substrate, wherein the first underlayer comprises an Ni—Ta alloy, Ni—Ti alloy, Co—Ti alloy, Ni—Ti—Ta alloy, Co—Ti—Ta alloy, Cr—Ta alloy, Cr—Ti—Ta alloy, Co—Cr—Zr alloy, Co—Al—Ti alloy, or Cr—Ti—Al alloy, the second underlayer comprises a W element or a W-containing alloy, the third underlayer comprises a Cr-based alloy layer of a body-centered cubic structure, and the magnetic layer comprises one or more Co-based alloy layers of a hexagonal close-packed structure.

The second underlayer used for the magnetic recording media described above preferably comprises W as a main ingredient and contains at least one kind of element selected from Co, Ni, Fe, Ti, Cr, and Ta. In particular, the second underlayer preferably comprises a W—Co alloy, W—Ni alloy, W—Fe alloy, W—Ti alloy, W—Cr alloy, or W—Ta alloy.

In a case where the second underlayer is a W—Co alloy, the W content in the underlayer is preferably about 30 at. % or more. A more preferred W content in the second underlayer is about 50 at. % or more and about 70 at. % or less. In a case where the second underlayer is a W—Co alloy and the W content in the second underlayer is about 90 at. % or more, the thickness of the second underlayer is preferably about 1 nm or less. In a case where the second underlayer is a W—Co alloy and the W content in the second underlayer is about 70 at. % or more and about 90 at. % or less, the thickness of the second underlayer is preferably about 2 ml or less. In a case where the second underlayer is a W—Co alloy and the W content in the second underlayer is about 50 at. % or more and about 70 at. % or less, the thickness of the second underlayer is preferably about 8 nm or less.

The first underlayer used for the magnetic recording media 1 and 2 described above is preferably an amorphous alloy comprising at least two kinds of elements selected from Ni, Co, Cr, Ti, Ta, Al, and Zr. It is particularly preferred that the first underlayer is an Ni—Ta alloy, Ni—Ti alloy, Co—Ti alloy, Cr—Ti alloy, Ni—Ti—Ta alloy, Co—Ti—Ta alloy, Cr—Ti—Ta alloy, Co—Cr—Zr alloy, Co—Al—Ti alloy, or Cr—Ti—Al alloy.

The third underlayer comprising the Cr-based alloy of the body-centered cubic structure used for the magnetic recording media described above is preferably a Cr—Ti—B alloy. Alternatively, the third underlayer comprising the Cr-based alloy of the body-centered cubic structure may be of a multi-layered structure formed with at least two kinds of alloys selected from Cr—Ti—B alloy, Cr—Mo alloy, Cr—Ti—Mo alloy, and Cr—Ti—Mo—B alloy. In particular, a two-layered structure in which the Cr—Ti—B alloy and the Cr—Mo alloy are stacked in this order is preferred.

The magnetic layer used for the magnetic recording media may also comprise plural Co-based alloy layers of a hexagonal close-packed structure anti-ferromagnetically coupled to each other by way of a non-magnetic intermediate layer. Alternatively, the magnetic layer used for the magnetic recording media may comprise three or more Co-based alloy layers of a hexagonal close-packed structure stacked by way of plural non-magnetic intermediate layers.

The magnetic layers are preferably oriented such that the (11.0) plane is substantially parallel with the substrate surface. Further, it is preferred that the ratio Hcc/Hcr between the coercive force Hcc measured in the circumferential direction and the coercive force Hcr measured in the radial direction is about 1.05 or more.

It is preferred that the half-width value $\Delta\theta 50$ in a rocking curve for the (11.0) plane of the magnetic layer in the circumferential direction of the medium is about 7° or less, when measured by using an X-ray diffraction apparatus using CuK$\alpha$1 rays as a source. The half-width value $\Delta\theta 50$ is more preferably about 5° or less.

The present inventors have found that a medium having an intense (11.0) orientation can be obtained by forming a layer comprising an amorphous alloy layer as a first underlayer on a substrate and forming a magnetic layer by way of a W alloy layer and a Cr alloy layer. Further, it has also been found that a medium having magnetic anisotropy intense in the circumferential direction can be obtained by forming the medium constituted as above on a substrate subjected to texturing in the circumferential direction. As the first underlayer, an amorphous alloy layer comprising at least two kinds of elements selected from Ni, Co, Ti, Ta, Al, and Zr, particularly, an Ni—Ta alloy, Ni—Ti alloy, Co—Ti alloy, Ni—Ti—Ta alloy, Co—Ti—Ta alloy, or Co—Al—Ti alloy may be used preferably. In addition to those described above, a Cr—Ta alloy, Cr—Ti—Ta alloy, Co—Cr—Zr alloy, or Cr—Ti—Al, etc. may also be used. "Amorphous" means herein that a material shows no distinct diffraction peak other than the halo pattern in an X-ray diffraction pattern, or the average grain size obtained from lattice images photographed under a high resolution electron microscope is about 5 nm or less. Since the same effect can be obtained for the first underlayer by any material so long as it has an amorphous structure, there is no particular restriction and other alloy materials than described above may be used.

The third underlayer comprising the Cr-based alloy of the body centered cubic structure can be provided with (100) orientation by using a W element or W-containing alloy for the second underlayer on the first underlayer. As the W alloy layer used for the second underlayer, W-based alloy containing at least one element selected from Co, Ni, Fe, Ti, Cr, and Ta, particularly, a W—Co alloy, W—Ni alloy, W—Fe alloy, W—Ti alloy, W—Cr alloy or W—Ta alloy can be used. Further, in a case of using the W—Co alloy, the W-content is preferably about 30 at. % or more. The (100) orientation in the third underlayer can be increased by artificially oxidizing the surface of the W alloy in an oxygen atmosphere or a mixed gas atmosphere in which oxygen is added to Ar after the W-alloy layer has been formed. The effect of the invention is provided also by a ternary or higher alloy system comprising W as the main ingredient and containing at least two kinds of elements selected from Co, Ni, Fe, Ti, Cr, and Ta, not limited only to the binary alloy described above.

As the material used for the third underlayer, use of a Cr-based alloy of a body-centered cubic structure containing at least Ti or B is particularly preferred since the grain size of the magnetic layer is micro-fined and the medium noise is reduced. A multi-layered structure of a Cr-based alloy layer of a body-centered cubic structure may also be used.

There is no particular limitation to the magnetic layer so long as it is a Co-based alloy of the hexagonal close-packed structure. The magnetic layer may also have a structure of stacking plural Co alloy layers or a structure stacking plural Co alloy layers by way of a non-magnetic intermediate layer. For example, it may have a constitution comprising a magnetic layer on the side of a substrate (lower magnetic layer) and a magnetic layer on the side of a protection film (upper magnetic layer) which is anti-ferromagnetically coupled therewith by way of a non-magnetic intermediate layer made of Ru or the like.

A glass substrate, Ni—P plated layer coated Al—Mg alloy substrate, or ceramic substrate can be used as the substrate. In a case of using a substrate that is formed with concentric grooves on the surface thereof by texturing, the circumferential coercive force is increased more than the radial coercive force, thereby enabling to improve the output resolution. Texturing may be applied directly to the surface of the substrate or may be applied after forming the first underlayer or the second underlayer.

When the magnetic recording medium described above is incorporated together with a compound type magnetic head having an electromagnetic induction type magnetic head for recording and a spin-valve type magnetic head for reading together, a magnetic recording apparatus with a high degree of reliability that has an areal recording density of 70 Mbits or more per 1 $mm^2$ can be provided as a second feature of the invention.

A magnetic recording medium having a high medium S/N ratio and also sufficient stability against thermal fluctuation can be attained according to embodiments of the present invention.

BRIEF DESCRIPTION OF THE DRAWINGS

FIG. 8 shows an X-ray rocking curve spectrum for the another medium according to the second embodiment of the invention.

FIG. 9 shows an X-ray rocking curve spectrum for the another medium according to the second embodiment of the invention.

DETAILED DESCRIPTION OF THE INVENTION

The present invention is to be described specifically by way of preferred embodiments with reference to the drawings.

Embodiment 1

Figure 1:
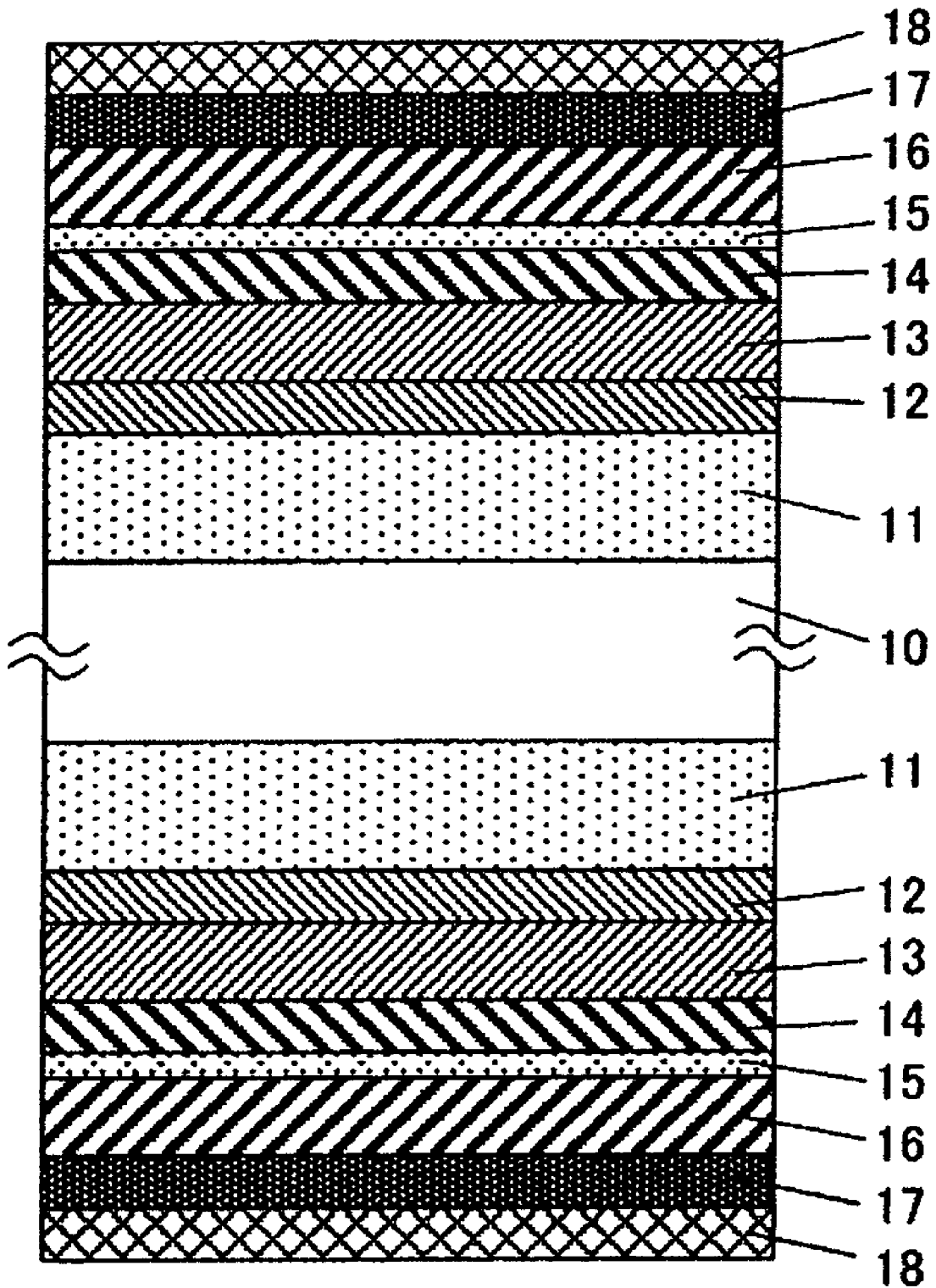
FIG. 1 is a schematic view showing an example of a cross-sectional structure of a magnetic recording medium according to an embodiment of the invention.

FIG. 1 shows a cross-sectional structural view of one embodiment of a magnetic recording medium according to the present invention. An alumino silicate glass substrate 10 with a chemically strengthened surface was put to alkali cleaning and dried and then an Ni-40 at. % Ta alloy layer of 30 nm thick as a first underlayer 11, and a W alloy layer of 1 nm thick as a second underlayer 12 were formed at room temperature. After heating the substrate to a temperature of about 240° C. by a lamp heater, a Cr-10 at. % Ti-5 at. % B alloy layer of about 10 nm thick was formed as a third underlayer 13. Further, a lower magnetic layer 14 comprising a Co-14 at. % Cr-6 at. % Pt alloy layer of about 3 nm thick, an Ru intermediate layer 15 of about 0.6 nm thick, and an upper magnetic layer 16 comprising a Co-18 at. % Cr-14 at. % Pt-8 at. % B alloy layer of about 18 nm thick were formed successively, and a carbon film 17 of about 3.2 nm thick was formed as a protection layer. For the second underlayer 12, a W-30 at. % Co (Specimen No. 101), W-30 at. % Ni (Specimen No. 102), W-30 at. % Fe (Specimen No. 103), W-30 at. % Ti (Specimen No. 104), W-25 at. % Cr (Specimen No. 105), or W-70 at. % Ta (Specimen No. 106) alloy was used. After forming the carbon film 17, a lubricant comprising perfluoroalkyl polyether as a main ingredient was coated to form a lubricant layer 18 of about 1.8 nm thick. The multi-layered film described above was formed by using a single wafer sputtering apparatus (MDP 250B) manufactured by Intevac Corp. A degree of base vacuum in the sputtering apparatus was set to 1.0 to 1.2×10-5 Pa and the tact time was set to 9 sec. The processes from the first underlayer 11 to the upper magnetic layer 16 were performed in an Ar gas atmosphere at about 0.93 Pa, heating was performed in a gas mixture atmosphere in which oxygen was added by 1% to Ar, and the carbon protection film 17 was formed in a mixed gas atmosphere in which nitrogen was added by about 10% to Ar.

Table 1 shows the magnetic characteristics and the read/write characteristics of media obtained in this embodiment (Specimen Nos. 101-106).

TABLE 1

| Specimen No. | Second Underlayer | Br·t [T·nm] | Hc [kA/m] | Hx [kA/m] | Resolution [%] | S/N [dB] |
|---|---|---|---|---|---|---|
| 101 | W-30 at. % Co | 4.35 | 331 | 51.3 | 52.5 | 28.2 |
| 102 | W-30 at. % Ni | 4.43 | 329 | 51.8 | 52.6 | 28.0 |
| 103 | W-30 at. % Fe | 4.45 | 325 | 49.0 | 51.5 | 28.1 |
| 104 | W-30 at. % Ti | 4.35 | 302 | 52.0 | 51.1 | 28.2 |
| 105 | W-25 at. % Cr | 4.48 | 342 | 48.9 | 52.2 | 27.9 |
| 106 | W-70 at. % Ta | 4.41 | 307 | 49.1 | 51.3 | 27.6 |

Figure 2:
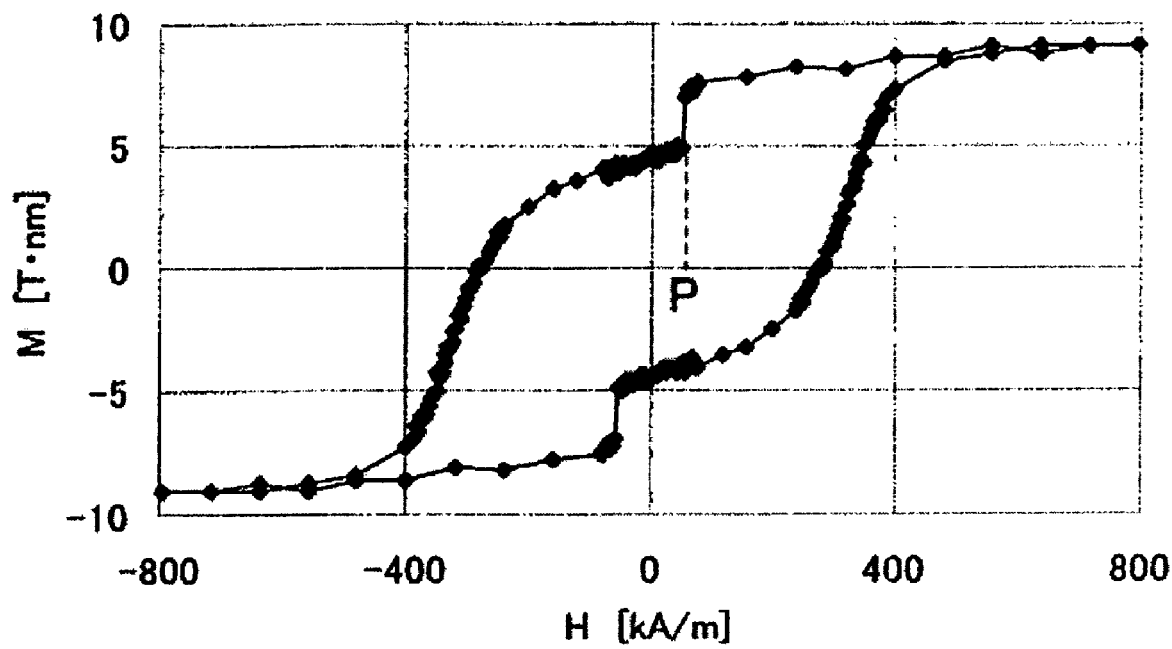
FIG. 2 shows a hysteresis curve for a medium according to a first embodiment of the invention.

The magnetic characteristics were evaluated by using a vibrating sample magnetometer (VSM) while applying a magnetic field with a maximum value of 796 kA/m in the circumferential direction at room temperature. Further, the read/write characteristics were evaluated by using a compound type magnetic head comprising a GMR (Giant Magneto Resistive) head having a shield gap length (Gs) of about 70 nm and a read track width (Twr) of about 110 nm and a writing head having a track width (Tww) of about 230 nm. Each of the media exhibited a coercive force of as high as about 300 kA/m or more. FIG. 2 shows a magnetization curve for a medium of Specimen No. 101. In the vicinity of 50 kA/m of the applied magnetic field, a step showing the magnetization reversal of the lower magnetic layer 14 was observed. The magnetic field generating the step was defined as a coupled magnetic field Hx. All Hx for the media of this embodiment showed positive values. This shows that the upper magnetic layer 16 and the lower magnetic layer 14 are anti-ferromagnetically coupled and, in the residual magnetization state, the magnetization of the lower magnetic layer 14 is in an anti-parallel relation with the magnetization of the upper magnetic layer 16. Accordingly, it is probable that the residual magnetization Br×t of the media in this embodiment generally provides Br×t=Br1×t1−Br2×t2 based on the residual magnetic flux density Br1 and the thickness t1 of the upper magnetic layer 16 and the residual magnetic flux density Br2 and the thickness t2 of the lower magnetic layer 14. Further, the read/write characteristics of the media in this embodiment were excellent. Any of the media showed a media S/N ratio of as high as about 27.5 dB or more and a resolution of as high as about 51% or higher. In particular, media using W—Co, and W—Ni alloys for the second underlayer 12 (Specimen Nos. 101 and 102) showed an S/N ratio of as high as about 28 dB or more and a resolution of as high as about 52.5% or higher. The S/N ratio was defined herein as: medium S/N=20 log (SMF/NdHF) by using medium noise (NdHF) and isolated read pulse output (So) when recorded at a maximum linear recording density of about 31.9 kFC/m (810 kFCI). On the other hand, the resolution was defined as: resolution=SMF/So by using the read output SMF at a linear recording density of 16.0 kFC/mm, i.e., one-half of the maximum linear recording density.

Figure 3:
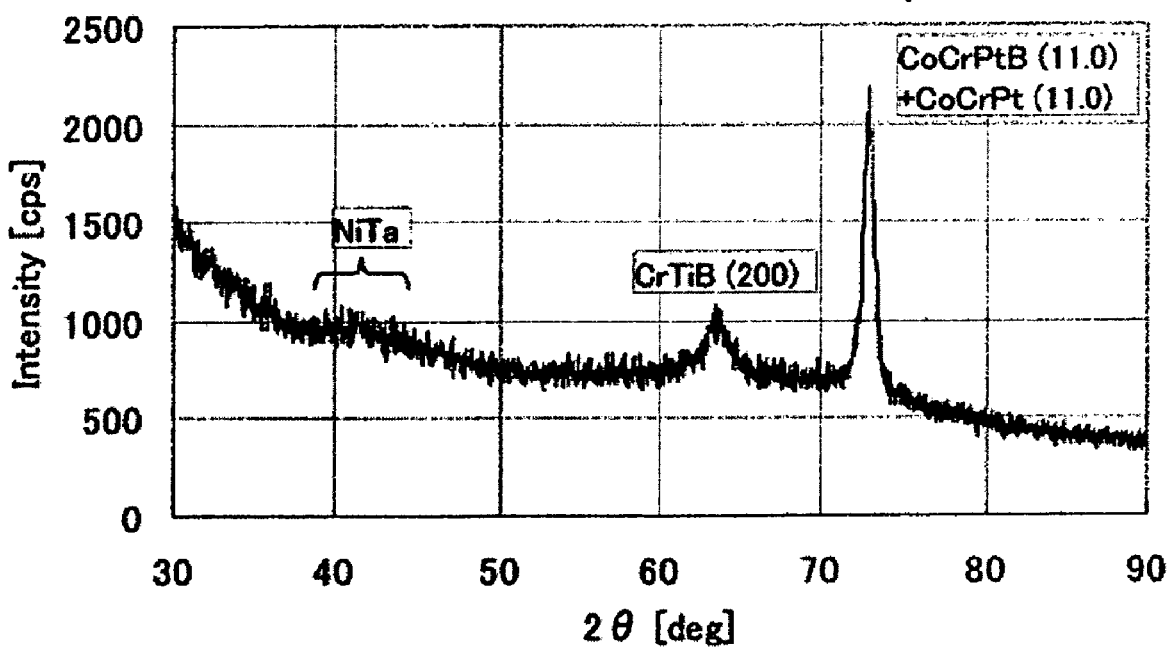
FIG. 3 shows an X-ray diffraction spectrum for the medium according to the first embodiment of the invention.

FIG. 3 shows an X-ray diffraction profile for a medium of Specimen No. 101. CuKα1 rays were used for an X-ray source. An intense diffraction peak from the (11.0) plane of the magnetic layer was observed in the vicinity of: 2θ=73° and 200 diffraction peaks for the Cr—Ti—B underlayer was observed in the vicinity of 2θ=64°. This is probably due to the fact that the magnetic layer was grown epitaxially on the (100) oriented Cr—Ti—B underlayer. Further, a broad halo pattern attributable to the Ni—Ta alloy in the first underlayer 11 was observed in the range: 2θ=40° to 43°, and it was confirmed that the Ni—Ta alloy had an amorphous structure. Similar diffraction patterns were observed for all other media in this embodiment and any of the media showed the (11.0) orientation in the magnetic layer.

Instead of the substrate described above, when a substrate applied with concentric texturing to the Al—Mg alloy surface coated with an Ni—P plated layer was heated to about 240° C., since the coercive force was increased by more than about 30 kA/m compared with the embodiment described above, a magnetic recording medium was formed in the same manner as in the embodiment described above except for lowering of the substrate temperature.

COMPARATIVE EXAMPLE 1

Recording media without the second underlayer in Embodiment 1 were prepared. Ni-40 at % Ta, W-30 at. % Co, W-30 at. % Ni, W-30 at. % Fe, W-30 at. % Ti and W-25 at. % Cr alloy layers each having a thickness of about 30 nm were formed at room temperature on an aluminum silicate glass substrate cleaned and dried in the same procedures as in Embodiment 1. After the substrate is heated to a temperature of about 240° C. by a lamp heater, a Cr-10 at.% Ti-5 at. % B underlayer, a magnetic layer and a carbon protection layer were formed successively. Composition, thickness and deposition process for each of the layers after the heating of the substrate were quite identical with those for the media in Embodiment 1.

Table 2 shows the magnetic characteristics and the write/read characteristics of the media of the comparative example evaluated in the same method as in Embodiment 1.

TABLE 2

| Specimen No. | First Underlayer | Br·t [T·nm] | Hc [kA/m] | Hx [kA/m] | Resolution [%] | S/N [dB] |
|---|---|---|---|---|---|---|
| 111 | Ni-40 at. % Ta | 4.29 | 317 | 50.1 | 48.5 | 27.5 |
| 112 | W-30 at. % Co | 4.47 | 309 | 47.6 | 52.3 | 26.4 |
| 113 | W-30 at. % Ni | 4.37 | 312 | 51.8 | 49.0 | 25.9 |
| 114 | W-30 at. % Fe | 4.29 | 319 | 51.7 | 50.4 | 26.3 |
| 115 | W-30 at. % Ti | 3.02 | 220 | 8.1 | — | — |

* Specimen Nos. 115 and 116 could not be evaluated for read/write characteristics because of insufficient output.

The medium using Ni-40 at. % Ta for the first underlayer (Specimen No. 111) could provide substantially the same magnetic characteristics as that for the medium of Embodiment 1, but the resolution was lower by about 2% or more. The media using W-30 at.% Co, W-30 at. % Ni and W-30 at. % Fe for the first underlayer (Specimen Nos. 112 to 114) could provide substantially the same magnetic characteristics as that for Embodiment 1, but S/N was lower by about 1 dB or more. In the media using W-30 at. % Ti and W-25 at. % Cr for the first underlayer (Specimen Nos. 115 and 116), the coercive force and Br×t were lower, and the read output was extremely low, so that the read/write characteristics could not be evaluated. Further, Specimen Nos. 112 to 116 involved a problem with sliding durability caused by peeling.

Figure 4:
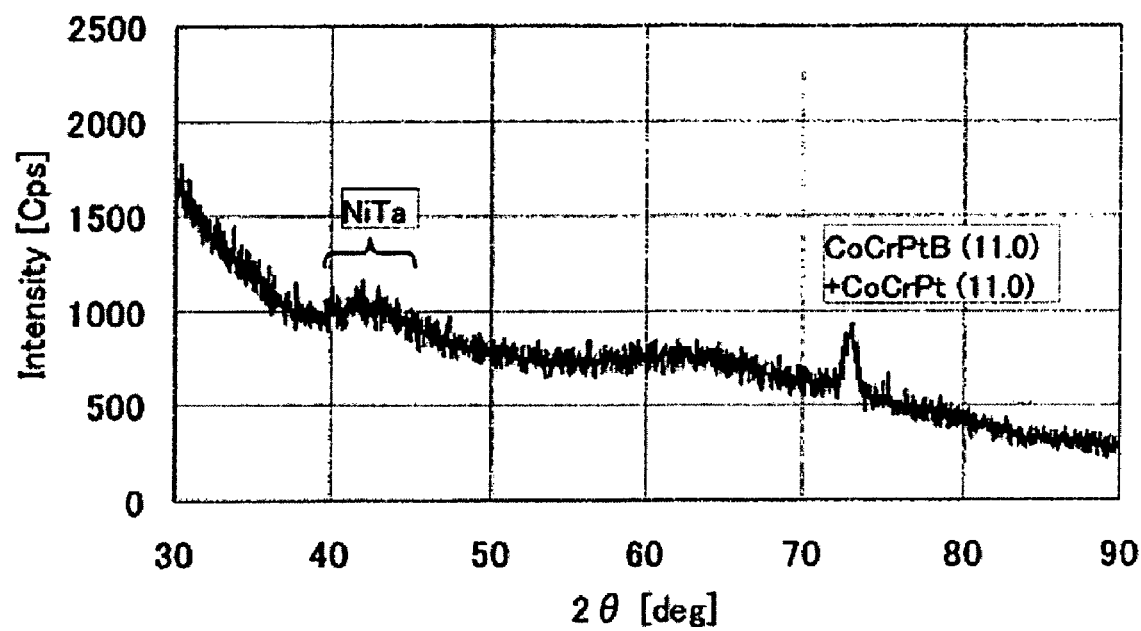
FIG. 4 shows an X-ray diffraction spectrum for a medium according to a comparative example.

When the X-ray diffraction profile was measured for Specimen No. 111, the diffraction peak from the (11.0) plane of the magnetic layer was decreased by about 50% or more compared with the Specimen No. 111 in Embodiment 1 (FIG. 4).

Embodiment 2

After an Ni-40 at. % alloy layer as a first underlayer 11 and a W element or W—Co alloy layer as a second underlayer 12 were formed to have a thickness of about 1 to 16 nm on a glass substrate 10, the substrate was heated to a temperature of about 240° C. by a lamp heater, and a third underlayer 13, magnetic layers (14-16), and a carbon protection film 17 were successively formed in this order. W, W-10 at. % Co, W-30 at. % Co, W-50 at. % Co, W-70 at.% Co and W-90 at. % Co alloys were used for the second underlayer 12 and they were deposited such that the total thickness of the first underlayer 11 and the second underlayer 12 were about 20 nm, 30 nm, and 40 nm. The third underlayer 13 and the magnetic layers (14-16) had layer structures identical with those in Embodiment 1 and the process conditions such as gas atmosphere and tact time were identical with the conditions in Embodiment 1.

Table 3 shows the magnetic characteristics and the read/write characteristics of the media according to this embodiment.

TABLE 3

| Specimen No. | Second Underlayer | Br·t [T·nm] | Hc [kA/m] | Resolution [%] | S/N [dB] | Δθ50 [deg] |
|---|---|---|---|---|---|---|
| 201 | W(1 nm) | 4.87 | 325 | 52.4 | 27.7 | 4.8 |
| 202 | W(2 nm) | 3.19 | 218 | — | — | — |
| 203 | W(4 nm) | 3.26 | 233 | — | — | — |
| 204 | W(8 nm) | 3.29 | 242 | — | — | — |
| 205 | W(16 nm) | 3.27 | 245 | — | — | — |
| 206 | W-10 at. % Co(1 nm) | 4.62 | 335 | 53.7 | 27.6 | 4.8 |
| 207 | W-10 at. % Co(2 nm) | 4.65 | 331 | 53.5 | 27.7 | 4.8 |
| 208 | W-10 at. % Co(4 nm) | 3.03 | 219 | — | — | — |
| 209 | W-10 at. % Co(8 nm) | 3.45 | 278 | — | — | — |
| 210 | W-10 at. % Co(16 nm) | 3.55 | 294 | — | — | — |
| 211 | W-30 at. % Co(1 nm) | 4.76 | 315 | 52.5 | 28.0 | 4.9 |
| 212 | W-30 at. % Co(2 nm) | 4.81 | 328 | 53.1 | 27.8 | 4.6 |
| 213 | W-30 at. % Co(4 nm) | 4.82 | 329 | 53.8 | 28.2 | 4.5 |
| 214 | W-30 at. % Co(8 nm) | 4.66 | 326 | 52.5 | 28.0 | 4.5 |
| 215 | W-30 at. % Co(16 nm) | 4.57 | 321 | 51.6 | 26.4 | — |
| 216 | W-50 at. % Co(1 nm) | 4.64 | 326 | 53.3 | 28.0 | 5.3 |
| 217 | W-50 at. % Co(2 nm) | 4.60 | 326 | 52.7 | 28.0 | 4.8 |
| 218 | W-50 at. % Co(4 nm) | 4.62 | 325 | 52.8 | 27.8 | 4.6 |
| 219 | W-50 at. % Co(8 nm) | 4.63 | 323 | 53.2 | 28.1 | 4.5 |
| 220 | W-50 at. % Co(16 nm) | 4.62 | 318 | 52.9 | 28.0 | 4.8 |
| 221 | W-70 at. % Co(1 nm) | 4.71 | 318 | 52.0 | 27.9 | 6.2 |
| 222 | W-70 at. % Co(2 nm) | 4.80 | 321 | 51.8 | 27.9 | 5.8 |
| 223 | W-70 at. % Co(4 nm) | 4.76 | 322 | 52.1 | 27.7 | 5.8 |
| 224 | W-70 at. % Co(8 nm) | 4.73 | 320 | 52.4 | 27.8 | 5.7 |
| 225 | W-70 at. % Co(16 nm) | 4.76 | 316 | 53.3 | 27.9 | 5.9 |

* Specimens Nos. 202, 203, 204, 205, 208, 209, and 210 could not be evaluated for read/write characteristics because of insufficient output for.
Specimens Nos. 202, 203, 204, 205, 208, 209, and 210 could not be evaluated for Δθ50 because of insufficient X-ray peak intensity.

Table 3 shows the examination result of recording media in a case of using a glass substrate in which the surface of the substrate was texturized concentrically, in which the total thickness of the first underlayer 11 and the second underlayer 12 was about 30 nm. Recording media using W for the second underlayer 12 (Specimen Nos. 201 to 205: W, 100 at.%) could provide a coercive force of as high as about 300 kA/m or more, a resolution of as high as about 52% or higher, and an S/N ratio of as high as about 27.5 dB or more only in a case where the thickness of W was about 1 nm. However, as the thickness of W increased to about 2 nm or more, Br×t and coercive force were decreased and the read output was extremely low, so that read/write characteristics could not be evaluated. Recording media using W-10 at. % Co for the second underlayer 12 (Specimens Nos. 206 to 210: W 90 at. %) could provide a coercive force of as high as 300 kA/m or more, a resolution of as extremely high as about 53.5% or higher, and an S/N ratio of as high as about 27.5 dB or more only in a case where the thickness of W-10 at. % Co was about 1 nm and 2 nm. As the thickness of W-10 at. % Co increased to about 4 nm or more, the Br×t and coercive force were decreased and the read output was extremely low, so that the read/write characteristics could not be evaluated. The media using W-30 at. % Co for the second underlayer (Specimen Nos. 211 to 214: W 70 at. %) could provide a coercive force of as high as 300 kA/m or more, a resolution of as high as about 11.5% or higher, and an S/N ratio of as high as about 27.5 dB or more in the media of about 1 to 8 nm thick for the W-30 at. % Co layer. On the other hand, the S/N ratio was lowered to about 26.4 dB in the medium of about 16 nm thick for the W-30 at. % Co layer (Specimen No. 215: W, 70 at. %). The media using W-50 at. % Co for the second underlayer 12 (Specimen Nos. 216 to 220: W, 50 at. %) could provide a coercive force of as high as about 300 kA/m, a resolution of as high as about 52.5% or higher, and an S/N ratio of as high as about 27.5 dB or more for all media having about 1 to 16 nm thick for the W-50 at. % Co layer. The media using W-70 at. % Co for the second underlayer 12 (Specimens Nos. 221 to 225: W 30 at. %) could provide a coercive force of as high as about 300 kA/m, a resolution of as high as about 51.5% or higher, and an S/N ratio of as high as about 27.5 dB or more for all of the media of about 1 to 16 nm thick for the W-70 at. % Co layer. In particular, media using W-30 at. % Co and W-50 at. % Co for the second underlayer 12 could provide a resolution of as extremely high as about 53% or higher and an S/N ratio of as extremely as about 28 dB or more as in Specimens Nos. 213, 216, 219. However, in a medium using W-90 at. % Co (W 10 at. %) for the second underlayer showed ferromagnetism in the W-90 at. % Co alloy layer and noise was increased relative to the media of the embodiments described above.

In view of the results described above, FIG. 10 shows a range related to the W concentration at. % in the second underlayer 12 (X-axis), and the film thickness for the second underlayer 12 (Y-axis) by a rectangular region. In a case where the W concentration is about 90 at. % or higher and about 100 at. % or lower, the same effect as that in Specimen No. 201 can be obtained in a range of the film thickness for the second underlayer of about 1 nm or less (but larger than 0 nm). Further, in a case where the W concentration is about 70 at. % or higher and about 90 at. % or lower, the same effect as in Specimen Nos. 206 and 207 can be obtained in a range of the film thickness for the second underlayer of about 2 nm or less (but larger than 0 nm). Further, in a case where the W concentration is about 50 at. % or higher and about 70 at. % or lower, the same effect as in the Specimen Nos. 211 to 214 can be obtained in a range of the film thickness for the second underlayer 12 of about 8 nm or less (but larger than 0 nm). Further, in a case where the W concentration is about 30 at. % or higher and about 50 at. % or lower, the same effect as that in Specimen Nos. 216 to 225 can be obtained in a range of the film thickness for the second underlayer 12 of at most about 16 nm or less (but larger than 0 nm), and a magnetic recording medium having the same characteristics can also be attained in a range of about 16 nm or more.

Figure 5:
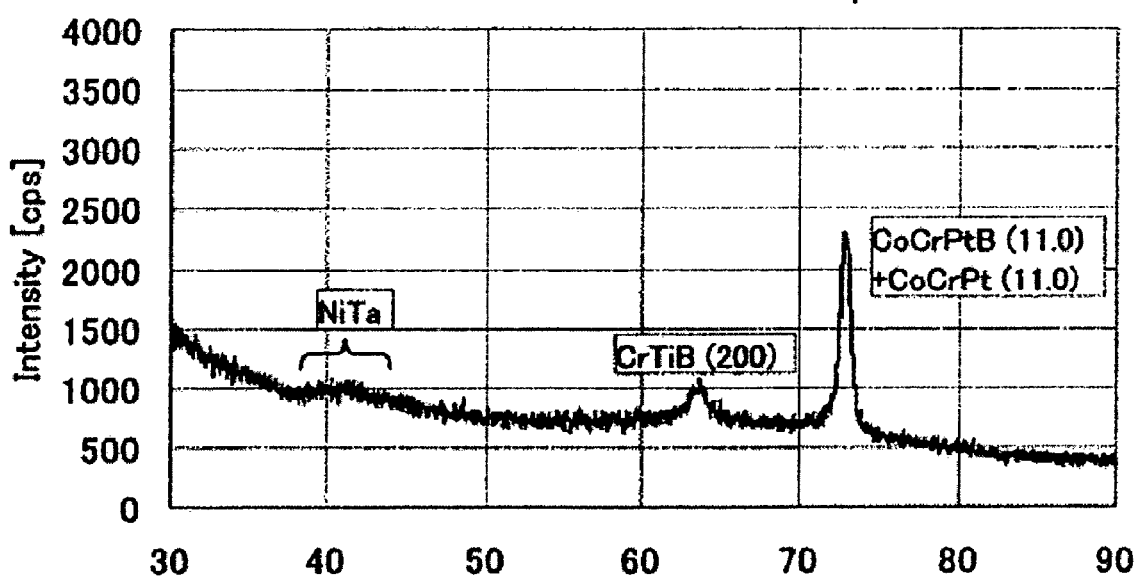
FIG. 5 shows an X-ray diffraction spectrum for a medium according to a second embodiment of the invention.
Figure 6:
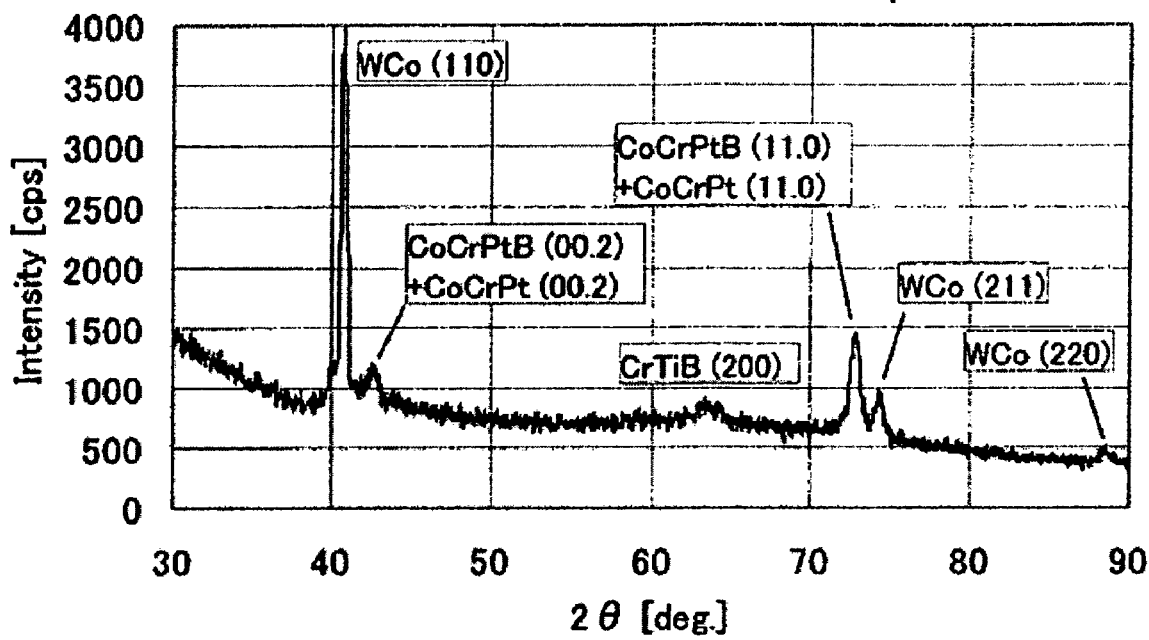
FIG. 6 shows an X-ray diffraction spectrum for another medium according to the second embodiment of the invention.

FIGS. 5 and 6 show X-ray diffraction profiles of media of Specimen Nos. 214 and 215. In Specimen No. 214, 11.0 diffraction peak for the magnetic layer and 200 diffraction peak for the Cr—Ti—B underlayer were observed. On the other hand, for Specimen No. 215 in which the S/N ratio was lowered, 00.2 diffraction peak was observed in addition to 11.0 diffraction peak for the magnetic layer 11 and 200 diffraction peak for the Cr—Ti—B underlayer was decreased, and 110 diffraction peak, 211 diffraction peak and 220 diffraction peak for the WCo layer were observed. It is probable that W—Co alloy was crystallized in Specimen No. 215 where the thickness of the W—Co layer increased up to 16 nm, giving effects on (100) orientation of the Cr—Ti—B underlayer and on (11.0) orientation for the magnetic layer. Also in Specimen Nos. 202 to 205, 208-210, 00.2 diffraction peaks for the magnetic layer and diffraction peaks attributable to the W alloy layer were observed.

Table 3 shows half value width $\Delta\theta$ 50 for the X-ray rocking curve of the specimens. In the media capable of obtaining the favorable read/write characteristics described above, $\Delta\theta$ 50 value of about 7° or less was obtained to show satisfactory in-plane orientation. In particular, for the medium using the second underlayer with the W content of about 50 at. % or more, a medium showing excellent in-plane orientation with the $\Delta\theta$ 50 value being about 5° or less was obtained and, particularly, in the medium using W-30 at. % Co or W-50 at. % Co providing excellent read/write characteristics, a medium showing excellent in-plane orientation showing $\Delta\theta$ 50 value of about 4.5° was obtained (Specimen Nos.: 213, 214, and 219).

Figure 7:
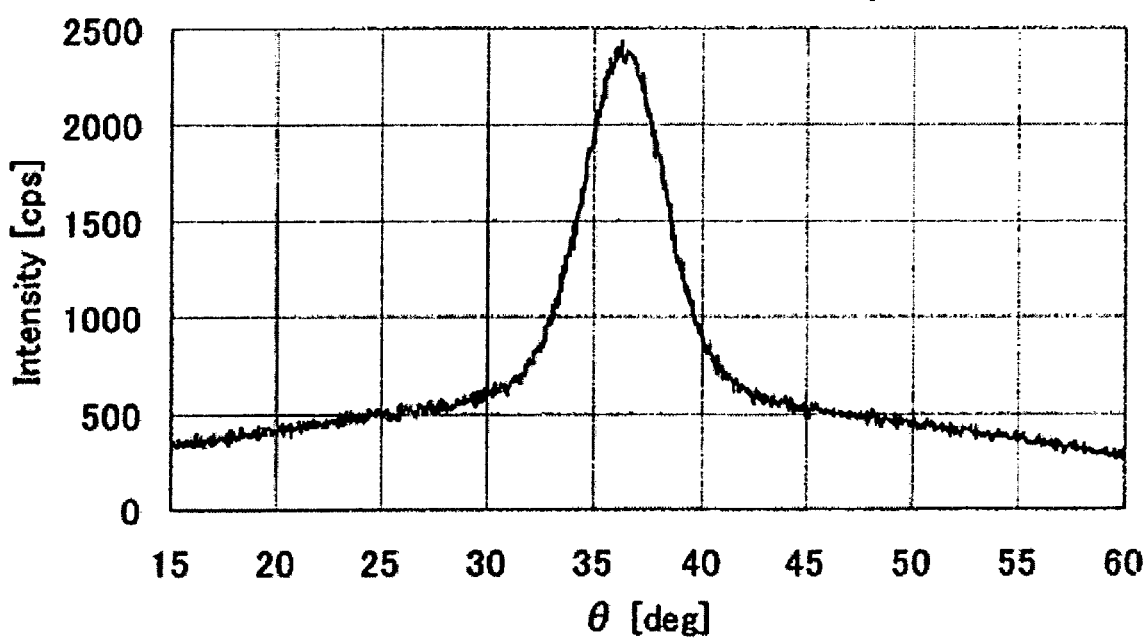
FIG. 7 shows an X-ray rocking curve spectrum for another medium according to the second embodiment of the invention.

The $\Delta\theta$ 50 value was determined by the following method. An X-ray apparatus, RINT1 400, manufactured by Rigaku Corp. was used, and CuK$\alpha$1 rays were used as an X-ray source. Rotational-paired cathodes made of copper were used for the X-ray source, and applied voltage was set to 50 kV and current was set to 160 mA. The optical system was constituted by using a curved monochrometer at a diversion slit of 1°, scattering slit of 1° and a photoreceiving slit of 0.3 mm. The incident direction of X-rays was set so as to be parallel with the circumferential direction of the medium. An angle for 2$\theta$ was set at 11.0 diffraction peak position of the magnetic layer obtained by $\theta$-2$\theta$ scanning as shown in FIG. 5, and $\theta$ was scanned on every 0.05° interval at a rate of 2°/min from 15° to 60° to measure the reflection intensity (FIG. 7). Then, the average of the reflection intensity was measured for that by the measurement of the rocking curve in the same manner by shifting the fixed angle from the 11.0 diffraction peak of the magnetic layer by +2°, and that by the measurement by shifting the fixed angle by −2° and the result of measurement was used as the background data (FIG. 8). The curve of the background in FIG. 8 was subtracted from the curve in FIG. 7 to determine the rocking curve for the magnetic layer (11.0) plane (FIG. 9). The half value width for the rocking curve in FIG. 9 was taken and defined as $\Delta\theta$ 50.

Figure 10:
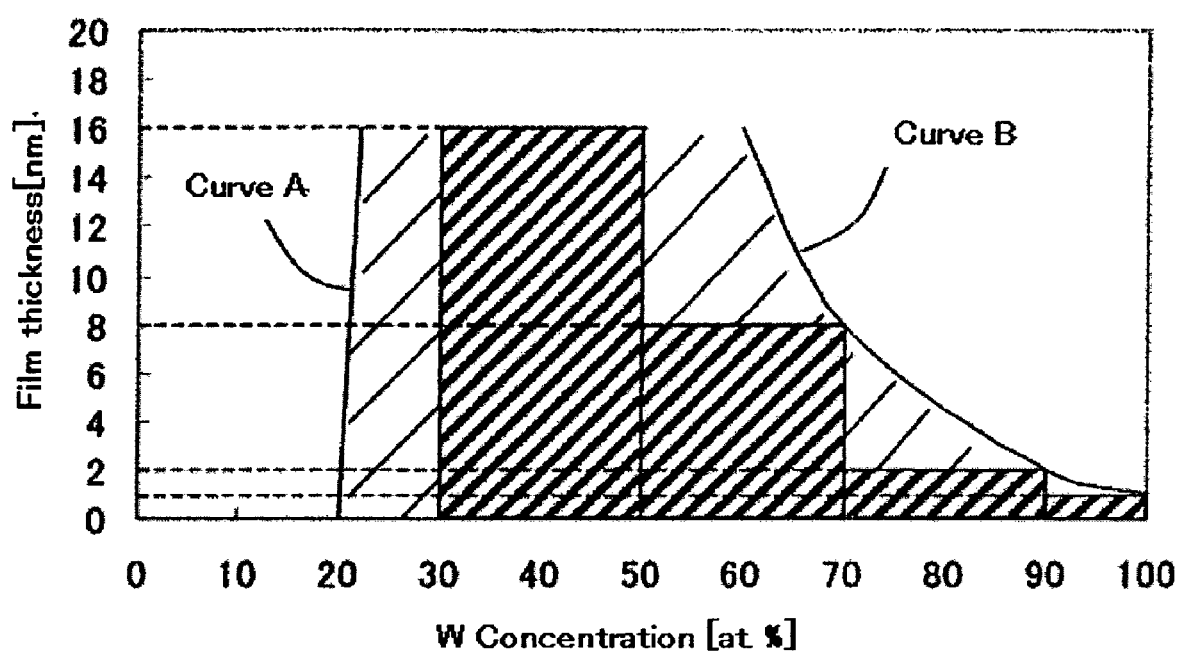
FIG. 10 is a graph showing a range for the composition and the thickness, which can provide an effect, in the embodiments of the invention.

In the embodiment described above, only the specified composition and the film thickness have been described for the W—Co alloy used for the second underlayer 12, but the composition for the W—Co alloy capable of obtaining favorable read/write characteristics is not restricted only to the composition and the thickness described above. For other concrete compositions of the W—Co alloy, W-based alloys containing at least one element selected from Co, Ni, Fe, Ti, Cr, and Ta, particularly, a W—Ni alloy, W—Fe alloy, W—Ti alloy, W—Cr alloy and W—Ta alloy can be used for the W alloy layer used for the second underlayer 12. Further, in this embodiment, the film thickness of about 1 nm or less could not be controlled sufficiently and the results were not shown in view of the problem with the controllability of the power source used when the W—Co alloy is deposited. However, the effect can be obtained also with the film thickness set to 1 nm or less so long as the sufficient controllability was attained for the film thickness. The relation between the composition and the film thickness of the W—Co alloy capable of obtaining favorable read/write characteristics is shown by a range (hatched region) surrounded by curves A and B shown in FIG. 10. In FIG. 10, good read/write characteristics were obtained also for the range where the thickness of the W—Co alloy exceeds about 16 nm in FIG. 10. However, no remarkable improving effect was recognized when the thickness of the W—Co alloy film increased to 16 nm or more.

COMPARATIVE EXAMPLE 2

Recording media (Specimen Nos. 231 to 235) using Ni-20 at. % P for the second underlayer in Embodiments 1 and 2 were prepared. On a glass substrate applied with concentric texturing on the surface of the substrate, were formed an Ni-40 at. % Ta alloy layer of about 28 to 10 nm thick as a first underlayer, and an Ni-20 at. % P alloy layer of about 2 to 20 nm thick as a second underlayer at room temperature. In this case, the first underlayer and the second underlayer were deposited such that the total film thickness thereof was 30 nm. After the substrate was heated to a temperature of about 240° C. by a lamp heater, a Cr-10 at.% Ti-5 At.% B underlayer, a magnetic layer and a carbon protection layer were formed successively. All of the composition, film thickness and deposition process for each of the layers after the heating of the substrate were identical with those for the media in Embodiment 2.

Table 4 shows the magnetic characteristics and the read/write characteristics of the media of the comparative example evaluated by the same procedures as those in Embodiment 1.

TABLE 4

| Specimen No. | Second Underlayer | Br·t [T·nm] | Hc [kA/m] | Resolution [%] | S/N [dB] | Δθ50 [deg] |
|---|---|---|---|---|---|---|
| 231 | Ni-20 at. % P(20 nm) | 4.25 | 231 | 48.3 | 27.8 | 11.0 |
| 232 | Ni-20 at. % P(15 nm) | 4.21 | 241 | 48.1 | 27.7 | 10.9 |
| 233 | Ni-20 at. % P(10 nm) | 4.24 | 251 | 48.3 | 28.0 | 10.8 |
| 234 | Ni-20 at. % P(5 nm) | 4.35 | 274 | 48.1 | 27.9 | 11.0 |
| 235 | Ni-20 at. % P(2 nm) | 4.27 | 264 | 48.0 | 28.0 | 11.2 |

In the media described above, the coercive force was lower by about 40 kA/m or more and the resolution was lower by about 4% or more compared with media, for example, of Specimens Nos. 213, 216, and 219 in Embodiment 2.

When the X-ray rocking curve of the resultant media was measured to determine Δθ 50, all of them showed values of about 10° or more which was greater by about 4° or more than the media described in Embodiment 2.

Embodiment 3

On a glass substrate applied with concentric texturing to the surface of the substrate, were formed an Ni—Ti alloy, Co—Ti alloy, Ni—Ti—Ta alloy, Co—Ti—Ta alloy, Cr—Ti—Ta alloy, Co—Cr—Zn alloy, Co—Al—Ti alloy, Cr—Ti—Al alloy or Cr—Ta alloy as a first underlayer 11 to have a thickness of about 25 nm. After a W-30 at. % Co alloy layer of about 5 nm thick was formed as a second underlayer 12, the substrate was heated to a temperature of about 280° C. by a lamp heater, and a third underlayer 13, magnetic layers 14 to 16 and a protection layer 17 were formed successively. All of the composition, the film thickness, and the deposition process for each of the layers after the heating of the substrate were identical with those for the media in Embodiment 1.

Table 5 shows the magnetic characteristics and the read/write characteristics of the media in this embodiment.

TABLE 5

| Specimen No. | First underlayer | Br·t [T·nm] | Hc [kA/m] | HcOR | Resolution [%] | S/N [dB] |
|---|---|---|---|---|---|---|
| 301 | Ni-50 at. % Ti | 4.77 | 315 | 1.08 | 54.3 | 28.1 |
| 302 | Co-50 at. % Ti | 4.88 | 312 | 1.09 | 54.1 | 28.0 |
| 303 | Cr-50 at. % Ti | 4.75 | 311 | 1.09 | 53.2 | 27.7 |
| 304 | Ni-48 at. % Ti-4 at. % Ta | 4.74 | 313 | 1.07 | 53.8 | 27.9 |
| 305 | Co-48 at. % Ti-4 at. % Ta | 4.78 | 313 | 1.08 | 53.7 | 28.0 |
| 306 | Cr-40 at. % Ti-5 at. % Ta | 4.71 | 315 | 1.07 | 53.3 | 28.1 |
| 307 | Co-30 at. % Cr-10 at. % Zr | 4.76 | 314 | 1.08 | 53.6 | 28.0 |
| 308 | Co-25 at. % Al-25 at. % Ti | 4.82 | 318 | 1.08 | 53.1 | 27.9 |
| 309 | Cr-44 at. % Ti-12 at. % Al | 4.80 | 312 | 1.07 | 53.8 | 28.0 |

Table 5 shows the evaluation results in a case of using an alloy layer of Ni-50 at. % Ti (Specimen No. 301), Co-50 at. % Ti (Specimen No. 302), Cr-50 at. % Ti (Specimen No. 303), Ni-48 at. % Ti-4 at. % Ta (Specimen No. 304), Co-48 at. % Ti-4 at. % Ta (Specimen No. 305), Cr-40 at. % Ti-5 at. % Ta (Specimen No. 306), Co-30 at. % Cr-10 at. % Zr (Specimen No. 307), Co-25 at. % Al-25 at. % Ti (Specimen No. 308), Cr-44 at. % Ti-12 at. % Al (Specimen No. 309), or Cr-70 at. % Ta (Specimen No. 310) for the first underlayer 11. HcOR is a value defined as; HcOR=Hcc/Hcr by using a coercive force Hcc measured by applying a magnetic field in the circumferential direction and a coercive force Hcr measured by applying a magnetic field in the radial direction. This shows that each of the media had HcOR of about 1.05 or more and was introduced with magnetic anisotropy in the circumferential direction. Further, each of the media showed a coercive force of as high as about 300 kA/m or more, a resolution power of as extremely high as about 53% or higher, and an S/N ratio of as high as about 27.5 dB or more. In particular, the medium using Ni-50 at. % Ti and the medium using Co-50 at. % Ti for the first underlayer 11 (Specimens No. 301 and 302) showed an output resolution of in excess of, as extremely high as about 54% and an S/N ratio of as extremely high as about 28 dB or more.

When the media obtained in this embodiment were subjected to X-ray diffractiometry, only the 11.0 diffraction peak for the magnetic layer and 200 diffraction for the Cr—Ti—B underlayer were observed in the same manner as the media for Specimen Nos. 101 and 214. No diffraction peak attributable to the first underlayer was observed and it could be confirmed that all the first underlayers in this embodiment were amorphous.

COMPARATIVE EXAMPLE 3

Recording media using Cr, Mo, Zr, Ti, or V for the first underlayer in Embodiment 3 were prepared. A Cr, Mo, Zr, Ti or V layer was formed as a first underlayer to have a thickness of 25 nm as a first underlayer and a W-30 at. % Co alloy layer of about 5 nm thick was formed as a second underlayer on a glass substrate applied with concentric texturing to the surface of the substrate of Embodiment 3. Thereafter, the substrate was heated to a temperature of about 280° C. by a lamp heater and then a Cr-10 at. % Ti-5 at. % B underlayer, magnetic layers and a carbon protection layer were formed successively. All the composition, the film thickness and the deposition process for each of the layers after the heating of the substrate were identical with those of the media in Embodiment 1.

TABLE 6

| Specimen No. | First Underlayer | Br · t [T · nm] | Hc [kA/m] | HcOR | Resolution [%] | S/N [dB] |
|---|---|---|---|---|---|---|
| 311 | Cr | 4.32 | 278 | 1.03 | 48.8 | 25.3 |
| 312 | Mo | 4.18 | 259 | 1.02 | 47.1 | 24.2 |
| 313 | Zr | 4.25 | 263 | 1.03 | 46.8 | 24.5 |
| 314 | Ti | 2.88 | 198 | 1.01 | — | — |
| 315 | V | 3.15 | 223 | 1.02 | — | — |

* Specimen Nos. 314 and 315 could not evaluated for read/write characteristics because of insufficient output When the obtained media (Table 6, Specimen Nos. 311 to 315) were subjected X-ray diffractiometry, in the media using Ti or V for the first underlayer (Specimen Nos. 314 and 315), 00.2 diffraction peak and diffraction peak from 10.1 plane were confirmed in addition to the 11.0 diffraction peak as the diffraction peak attributable to the magnetic layer. On the other hand, in the media using Cr, Mo, and Zr (Specimen Nos. 311 to 313), only the 11.0 diffraction peak was observed for the diffraction peak attributable to the magnetic layer, but the peak intensity was lower by 30% or more than that of the media shown in Embodiment 3. Further, diffraction peak attributable to the first underlayer was observed in all of the media. Hcc of the media obtained in this comparative example was greatly lower than Hcc of the media in Embodiment 3 using the amorphous alloy for the first underlayer. This is probably because (11.0) orientation of the magnetic layer is weak as described above. Further, HcOR is about 1.05 or less as well and it can be seen that the effect of introducing anisotropy in the circumferential direction is also weak. In the read/write characteristics of the obtained media, the resolution was lower by about 4% or more and the S/N ratio was lower by about 2 dB or more than those of the media in Embodiment 3. Since the read output was extremely low in the media using Ti and V (Specimen Nos. 314, 315), read/write characteristics could not be evaluated.

Embodiment 4

On a glass substrate, were formed an Ni-40 at. % Ta alloy layer as a first underlayer 11 to have a thickness of about 15 nm and a W-30 at. % Co alloy layer as a second underlayer 12 to have a thickness of about 5 nm. Thereafter, the substrate was heated to a temperature of 290° C. by a lamp heater, and a third underlayer 13 prepared by stacking two Cr alloy layers of different compositions was formed. Further, a Co-16 at. % Cr-9 at. % Pt alloy layer of about 3 nm thick, an Ru intermediate layer of about 0.6 nm thick, a Co-20 at. % Cr-10 at. % Pt-7 at. % B alloy layer of 6 nm thick, and a Co-16 at. % Cr-14 at. % Pt-10 at. % B alloy layer of about 10 nm thick were successively formed as respective magnetic layers (14 to 16), and a protection layer 17 was formed thereon. For the third underlayer 13, a stacked film of a Cr-10 at. % Ti-5 at. % B alloy layer of 5 nm thick and Cr-30 at. % Mo alloy layer of about 2 nm thick, a stacked film of Cr-10 at. % Ti-5 at. % B alloy layer of about 5 nm thick and Cr-20 at. % Ti-10 at. % Mo alloy layer of about 2 nm thick, or a stacked film of Cr-10 at. % Ti-10 at. % Mo-5 at. % B alloy layer of about 5 nm thick and a Cr-30 at. % Mo alloy layer of about 2 nm thick was used. Each of the process conditions such as the gas atmosphere or the tact time was identical with the conditions in Embodiment 1.

Table 7 shows the magnetic characteristics and the read/write characteristics of the media of this embodiment.

TABLE 7

| Specimen No. | Third Underlayer | Br · t [T · nm] | Hc [kA/m] | Resolution [%] | S/N [dB] |
|---|---|---|---|---|---|
| 401 | Cr-10 at. % Ti-5 at. % B/ Cr-30 at. % Mo | 4.82 | 302 | 53.3 | 28.3 |
| 402 | Cr-10 at. % Ti-5 at. % B/ Cr-20 at. % Ti-10 at. % Mo | 4.88 | 317 | 52.7 | 27.8 |
| 403 | Cr-10 at. % Ti-10 at. % Mo-5 at. % B/ Cr-30 at. % Mo | 4.77 | 307 | 51.9 | 27.6 |

Any of the media showed a coercive force of as high as about 300 kA/m or more, a resolution of as extremely high as about 51% or higher, and an S/N ratio of as high as about 27.5 dB or more. In particular, a medium using a stacked film of a Cr-10 at. % Ti-5 at. % B and Cr-30 at. % Mo for the third underlayer 13 (Specimen No. 401) showed a resolution of as extremely high as about 53.5% and an S/N ratio of as high as about 28.3 dB.

Embodiment 5

A Co-50 at. % Ti alloy layer as a first underlayer 11 having a thickness of 20 nm and a W-20 at. % Co-10 at. % Ti, a W-20 at. % Co-10 at. % Cr or W-20 at. % Co-10 at. % Ta alloy layer as a second underlayer 12 having a thickness of about 1 to 5 nm were formed on a glass substrate applied with concentric texturing at the substrate surface. The substrate was then heated to a temperature of 290° C. by a lamp heater. After a stacked film of Cr-10 at. % Ti-5 at.% B alloy layer of about 5 nm thick, and Cr-30 at. % Mo alloy layer of about 2 nm thick was formed as a third underlayer 13, a Co-16 at. % Cr-9 at. % Pt alloy layer of about 3 nm thick, an Ru intermediate layer of about 0.6 nm thick, a Co-20 at. % Cr-11 at. % Pt-7 at. % B alloy layer of about 3 nm thick, and a Co-16 at. % Cr-14 at. % Pt-10 at. % B alloy layer of about 10 nm thick were formed successively as respective magnetic layers (14 to 16), and protection layer was formed thereon. The processing conditions such as the gas atmosphere or the tact time were identical with the conditions in Embodiment 1.

Table 8 shows the magnetic characteristics and the read/write characteristics of this embodiment.

TABLE 8

| Specimen No. | Second Underlayer | Br·t [T·nm] | Hc [kA/m] | Resolution [%] | S/N [dB] |
|---|---|---|---|---|---|
| 501 | W-20 at. % Co-10 at. % Ti(1 nm) | 4.82 | 308 | 52.6 | 27.9 |
| 502 | W-20 at. % Co-10 at. % Ti(3 nm) | 4.86 | 309 | 53.1 | 28.0 |
| 503 | W-20 at. % Co-10 at. % Ti(5 nm) | 4.79 | 301 | 53.1 | 28.1 |
| 504 | W-20 at. % Co-10 at. % Cr(1 nm) | 4.79 | 308 | 52.9 | 27.7 |
| 505 | W-20 at. % Co-11 at. % Cr(3 nm) | 4.82 | 312 | 52.3 | 27.8 |
| 506 | W-20 at. % Co-12 at. % Cr(5 nm) | 4.80 | 316 | 53.4 | 27.8 |
| 507 | W-20 at. % Co-10 at. % Ta(1 nm) | 4.74 | 307 | 51.3 | 28.0 |
| 508 | W-20 at. % Co-11 at. % Ta(3 nm) | 4.77 | 314 | 52.0 | 27.9 |
| 509 | W-20 at. % Co-12 at. % Ta(5 nm) | 4.80 | 314 | 51.3 | 28.0 |

Any of the media showed a coercive force of as high as about 300 kA/m or higher, a resolution of as extremely high as about 51% or higher, and an S/N ratio of as high as about 27.5 dB or more.

Embodiment 6

After on a glass substrate, were formed an Ni-40 at. % Ta alloy layer as a first underlayer 11 having a thickness of about 15 nm and a W-30 at. % Co alloy layer as a second underlayer 12 having a thickness of about 5 nm, the substrate was heated to a temperature of about 260° C. by a lamp heater. Then Cr-10 at. % Ti-3 at. % B alloy of about 10 nm thickness was formed as a third underlayer 13. Further, a Co-16 at. % Cr-9 at. % Pt alloy layer of about 3 nm thick, an Ru intermediate layer of about 0.6 nm thick, a Co-16 at. % Cr-12 at. % Pt-8 at.% B alloy layer of about 11 nm thick, an Ru intermediate layer of about 0.7 nm thick, and a Co-16 at. % Cr-14 at. % Pt-8 at. % B alloy layer were formed successively as respective magnetic layers (14 to 16) and a protection layer was formed thereon.

The media of this embodiment showed Brt of 8.03 T·m and a coercive force of as high as about 307 kA/m as the magnetic characteristics and the read/write characteristics and showed an S/N ratio of as extremely high as about 28.8 dB compared with Embodiments 1 and 2.

The magnetic recording medium obtained by embodiments of the present invention is applicable to a magnetic recording apparatus capable of recording information of large capacity.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic recording medium having a magnetic layer, comprising:
a substrate; and
a first underlayer, a second underlayer, and a third underlayer, which are provided on the substrate;
wherein,
the magnetic layer is provided on the third underlayer, the first underlayer comprises an alloy of an amorphous structure and is formed over the substrate,
the second underlayer comprises a W element or a W-containing alloy and is formed over the first underlayer,
the third underlayer comprises a two-layer structure including a Cr—Ti—B alloy stacked on a Cr—Mo alloy of a body-centered cubic structure and is formed over the second underlayer, and
the magnetic layer is one or more Co-based alloy layers of a hexagonal close-packed structure.

2. A magnetic recording medium according to claim 1, wherein the second underlayer is based on W and contains at least one element selected from the group consisting of Co, Ni, Fe, Ti, Cr, and Ta.

3. A magnetic recording medium according to claim 2, wherein the W content in the second underlayer is about 90 at. % or more and about 100 at. % or less, and the second underlayer has a thickness of about 1 nm or less.

4. A magnetic recording medium according to claim 2, wherein the W content in the second underlayer is about 70 at. % or more and about 90 at. % or less, and the second underlayer has a thickness of about 2 nm or less.

5. A magnetic recording medium according to claim 2, wherein the W content in the second underlayer is about 50 at. % or more and about 70 at. % or less, and the second underlayer has a thickness of about 8 nm or less.

6. A magnetic recording medium according to claim 2, wherein the W content in the second underlayer is about 30 at. % or more and about 50 at. % or less.

7. A magnetic recording medium according to claim 1, wherein the W content in the second underlayer is about 30 at. % or more and about 100 at. % or less.

8. A magnetic recording medium according to claim 1, wherein the magnetic layer comprises a plurality of Co-based alloy layers of a hexagonal close-packed structure which are anti-ferromagnetically coupled with each other by way of a non-magnetic intermediate layer.

9. A magnetic recording medium according to claim 1, wherein the magnetic layer comprises three or more Co-based alloy layers of a hexagonal close-packed structure which are stacked by way of a plurality of non-magnetic intermediate layers.

10. A magnetic recording medium according to claim 1, wherein the magnetic layer is oriented substantially such that the (11.0) plane is substantially parallel with a surface of the substrate.

11. A magnetic recording medium according to claim 1 wherein a ratio Hcc/Hcr between a coercive force Hcc measured in the circumferential direction and a coercive force Hcr measured in the radial direction is about 1.05 or more.

12. A magnetic recording medium according to claim 1, wherein a half value width $\Delta\theta$ 50 is about 7° or less, which is determined based on a rocking curve for a (11.0) plane of a magnetic layer in a circumferential direction of the medium when measured by using an X-ray diffraction apparatus using CuK$\alpha$1 rays as a source such that an incident direction of X-rays is in parallel with the circumferential direction of the medium.

13. A magnetic recording medium according to claim 12, wherein the half value width $\Delta\theta$ 50 determined based on the rocking curve for the (11.0) plane of the magnetic layer in the circumferential direction of the medium is about 5° or less.

14. A magnetic recording medium having a magnetic layer, comprising:
a substrate; and
a first underlayer, a second underlayer, and a third underlayer, which are provided on the substrate;

wherein, the magnetic layer is provided on the third underlayer, the first underlayer comprises an amorphous alloy comprising at least two kinds of elements selected from Ni, Co, Ti, Ta, Al, and Zr, the first underlayer being formed over the substrate, the second underlayer comprises a W element or a W-containing alloy, the second underlayer being formed over the first underlayer, the third underlayer comprises a two layer-structure including a Cr—Ti—B alloy stacked on a Cr—Mo alloy of a body-centered cubic structure and is formed over the second underlayer, and the magnetic layer is one or more Co-based alloy layers of a hexagonal close-packed structure.

15. A magnetic recording medium having a magnetic layer, comprising:

a substrate; and a first underlayer, a second underlayer and a third underlayer, which are provided on a substrate;

wherein, a magnetic layer is provided on the third underlayer, the first underlayer comprises an Ni—Ta alloy, Ni—Ti alloy, Co—Ti alloy, Ni—Ti—Ta alloy, Co—Ti—Ta alloy, Cr—Ta alloy, Cr—Ti—Ta alloy, Co—Cr—Zr alloy, Co—Al—Ti alloy, or Cr—Ti—Al alloy, the first underlayer being formed over the substrate, the second underlayer comprises a W element or a W-containing alloy, the second underlayer being formed over the first underlayer, the third underlayer comprises a two-layer structure including a Cr—Ti—B alloy stacked on a Cr—Mo alloy of a body-centered cubic structure and is formed over the second underlayer, and the magnetic layer comprises one or more of Co-based alloy layers of a hexagonal close-packed structure.

16. A magnetic recording medium according to claim 15, wherein a half value width $\Delta\theta$ 50 is about 5° or less, which is determined based on a rocking curve for a (11.0) plane of a magnetic layer in a circumferential direction of the medium when measured by using an X-ray diffraction apparatus using CuK$\alpha$1 rays as a source such that an incident direction of X-rays is in parallel with the circumferential direction of the medium;

wherein a glass substrate is used which is formed with grooves at a surface of the substrate by texturing substantially in a circumferential direction of the substrate; and wherein the magnetic layer is substantially oriented such that the (11.0) plane is substantially parallel with the substrate surface.

* * * * *

UNITED STATES PATENT AND TRADEMARK OFFICE
CERTIFICATE OF CORRECTION

PATENT NO. : 7,517,597 B2 Page 1 of 1
APPLICATION NO. : 11/012387
DATED : April 14, 2009
INVENTOR(S) : Hinoue et al.

It is certified that error appears in the above-identified patent and that said Letters Patent is hereby corrected as shown below:

In the Detailed Description:

Column 8, line 66; please delete "and 210" and insert --210, and 215--

Column 14, line 3; please delete "Cr-10" and insert --Cr-11--

Signed and Sealed this

Ninth Day of June, 2009

JOHN DOLL
*Acting Director of the United States Patent and Trademark Office*